Patented Apr. 15, 1924.

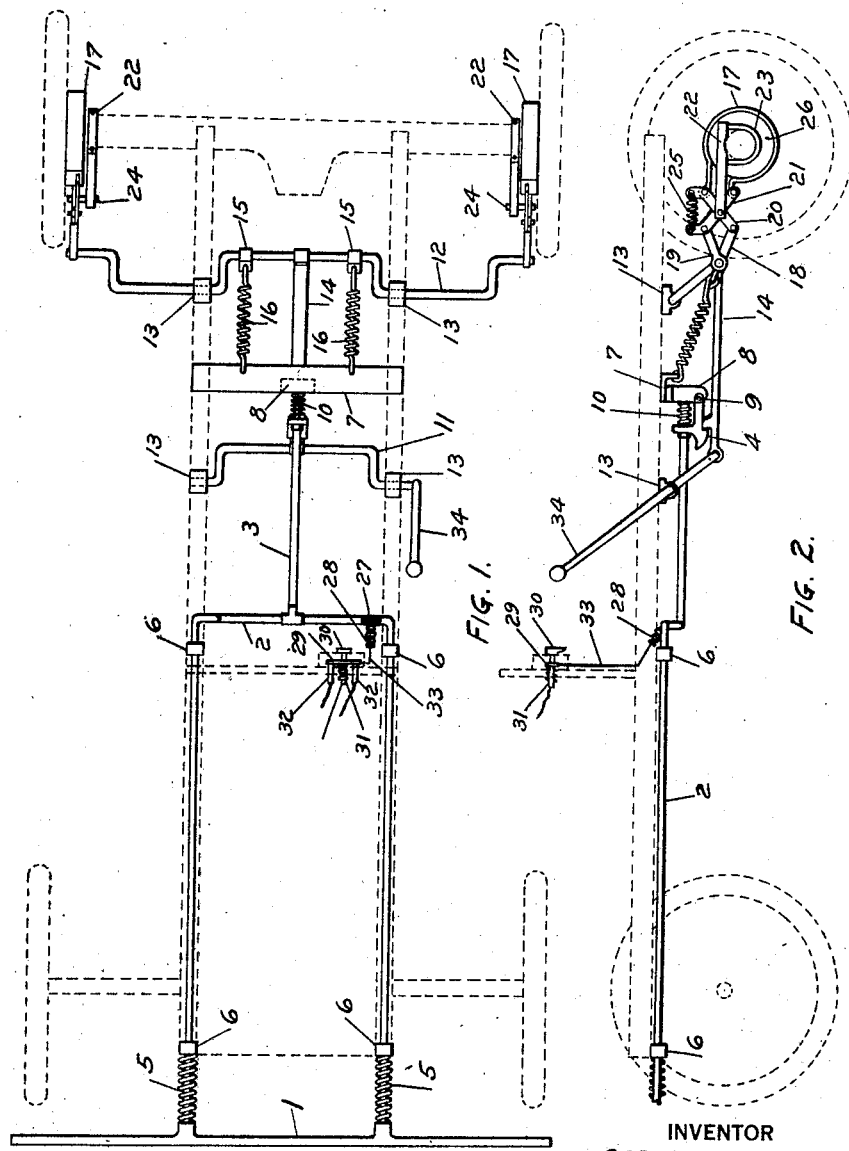

1,490,593

UNITED STATES PATENT OFFICE.

CARMINE CURTI, OF PITTSFIELD, MASSACHUSETTS.

SAFETY AUTOMOBILE BRAKE.

Application filed September 12, 1922. Serial No. 587,761.

*To all whom it may concern:*

Be it known that I, CARMINE CURTI, a citizen of the United States, residing at Pittsfield, in the county of Berkshire and State of Massachusetts, have invented certain new and useful Improvements in Safety Automobile Brakes, of which the following is a specification.

My invention relates to an improved safety automobile brake so designed and constructed that it is operable by the occupant, to release the brakes, by means of a hand lever or a lever operated by foot power.

The principal object of the invention is to generally improve devices of this class by providing one of extreme simplicity and durability which is well balanced and so constructed that it is easy to operate.

Another feature of the device is to provide a safety device of this class which embodies a novel arrangement of parts, and so constructed that a slight pressure on the bumper of the automobile will set the brakes and cut off the power from the motor.

It it well known in practice that when an automobile is in motion and strikes an object the momentum of the car will cause it to continue on for some distance. The primary object of my invention is to reduce the momentum to a minimum, and to accomplish this I employ a set of brakes attached to the rear axle of the car, and these brakes are so constructed that a slight pressure on the bumper bar of the car will securely set the brakes on the brake drums which are attached to the rear axle.

With the foregoing and other objects in view as will hereinafter appear from time to time, this invention consists in the peculiar combination and arrangement of the various related elements of a safety automobile brake as hereinafter set forth and more particularly described in the appended claims.

Referring to the accompanying drawing forming a portion of this specification and in which the same reference characters indicate the same parts wherever used:

Figure 1 is a plan view of an automobile chassis and wheels shown in dotted lines with the automobile safety device attached thereto. Figure 2 is an elevation of the automobile chassis and wheels shown in dotted lines with my safety device attached thereto. The chassis shown is that of a Ford car, but my device can be attached to any standard make of car without departing from the spirit of my invention.

As illustrated in the accompanying drawing, 1 is a bumper to which is attached a U shaped trip bar 2 and the bar is provided on the inner end with an extension bar 3; the inner end of the said extension bar rests against the trip 4 but is not attached thereto. The U bar 2 is provided with springs 5 and the said bar is attached to the chassis by means of bearings 6 and is free to work longitudinally along the chassis and through the bearings 6. An angle 7 is rigidly secured to the chassis intermediate the rear and forward crank shafts 12 and 11 and mounted thereon is the tripping mechanism. The tripping mechanism consists of a support depending from the said angle and rigidly attached thereto, and to this support is pivotally attached the trip 4. The trip 4 is connected to the support 8 by means of a pin 9, and the said trip is provided with an extension on the inner side which partly passes through the spring 10 and is connected to the said spring, and is also the means whereby the spring is held in position to co-operate with the said trip, and also with the cross rod 14.

The crank shaft 12 is rockably mounted on the car chassis by means of blocks 13 and is provided in the center with bearings 15 which are rotatably mounted thereon. Secured to the bearings at their one end and to the angle 7 at their other end are two springs 16, and these springs are the means by which the brakes are operated and compressed about the brake drums 26.

The links 20 and 21 are diagonally connected to the brake band and said links are pivotally connected in the center to the brace 22 and the said brace is secured to the rear axle housing by means of a U bolt 23. The links 18 and 19 are angularly connected to the links 20 and 21 at one end and at the other end to the rear crank shaft and are free to rotate about said shaft.

The brake band 17 has a projection on the inner and upper end and a spring 25 is connected to this projection, and the said spring is also connected to the upper end of the link 21. This spring acts as a compression spring and when the device is set as shown in the drawing the spring exerts a pressure on the brake band 17 and the link 21 thereby causing the brake band to expand and ride freely over the brake drum.

The crank shaft 11 is rockably mounted on the car chassis by means of blocks 13 and said crank shaft is provided with a handle or lever 34; this handle being the means by which the brake mechanism is operated by the occupant to release the brakes and to cause the projection on the cross rod 14 to be brought in position to engage and co-operate with the trip 4.

It will also be noticed that the device may be directly mounted on the rear housing between the chassis by placing the brake drum on the axle, thereby overcoming any inconvenience that may be encountered by placing the device outside the chassis.

The operation of the device is as follows: A force applied to the bumper and towards the automobile is transmitted longitudinally along the U bar and the extension bar 3. The inner end of the extension bar rests against the trip 4, but not secured thereto, and the force applied to the U bar raises the trip from the projection on the cross rod 14. When the trip is released the tension on the springs 16 is released also and the crank shafts are forced in a forward direction, and the force from the said springs causes the crank shafts to turn and this motion is in turn imparted to the links 18—19—20—21 and cause the said links to draw together and compress the brake band tightly about the brake drum 26.

The brakes are released, and the trip set, by a forward motion applied to the handle 34.

Having thus described my invention what I claim as new and desire to secure by Letters Patent is:

1. In a device of the class described the combination with a brake band, links connected to the said brake band, and means to support said links, a spring connected to one of the said links and to the said brake band, links connected to the said links and extending therefrom and pivotally connected to a rear crank shaft, said rear crank shaft rockably mounted on the car chassis by means of blocks, bearings rotatably mounted on the center of said rear crank shaft, a forward crank shaft provided with an operating handle said forward crank shaft rockably mounted on the car chassis by means of blocks, a cross bar rigidly secured to the chassis intermediate the rear and forward crank shafts, springs connected to the bearings on the rear crank shaft and to the said cross bar, a support depending from the said cross bar and a trip pivotally connected thereto, a spring to operate said trip and means to hold said spring in place, a cross rod rotatably connected to the rear crank shaft on its one end and to the forward crank shaft on its other end and so designed to engage and co-operate with said trip, means to operate said trip to set the brake bands around the brake drums.

2. In a device of the class described the combination with a brake band, links diagonally connected to the said brake band and said links pivotally connected in the center, means to support said links, a spring connected to one of the said links and to the said brake band, links angularly connected to said links and extending therefrom and pivotally connected to a rear crank shaft, said rear crank shaft rockably mounted on the car chassis by means of blocks, bearings rotatably mounted on the center of the rear crank shaft between the chassis, a forward crank shaft provided with an operating handle rigidly attached thereto, said forward crank shaft rockably mounted on the car chassis by means of blocks, a cross bar extending across the car chassis intermediate the rear and the forward crank shafts, springs connected to the bearings on the rear crank shaft and to the said cross bar, a support depending from the said cross bar and a trip pivotally connected thereto, a spring to operate said trip and means to hold said spring in place, a cross rod provided with a projection on the forward end said cross rod rotatably connected to the rear crank shaft on its one end and to the forward crank shaft on its other end and so designed to engage and co-operate with said trip, means to operate said trip to set the brake bands around the brake drums.

In testimony whereof I affix my signature.

CARMINE CURTI.